US007859536B2

(12) United States Patent  (10) Patent No.: US 7,859,536 B2
Poppen  (45) Date of Patent: Dec. 28, 2010

(54) GENERALIZATION OF FEATURES IN A DIGITAL MAP

(75) Inventor: Richard F. Poppen, San Jose, CA (US)

(73) Assignee: deCarta Inc., San Jose, CA (US)

( * ) Notice: Subject to any disclaimer, the term of this patent is extended or adjusted under 35 U.S.C. 154(b) by 245 days.

(21) Appl. No.: 11/460,226

(22) Filed: Jul. 26, 2006

(65) Prior Publication Data
US 2007/0024624 A1  Feb. 1, 2007

Related U.S. Application Data

(60) Provisional application No. 60/702,778, filed on Jul. 26, 2005.

(51) Int. Cl.
G06T 11/20 (2006.01)
G08G 1/123 (2006.01)
G01C 21/30 (2006.01)

(52) U.S. Cl. .................. 345/441; 345/442; 345/443; 340/995.1; 701/208

(58) Field of Classification Search ......... 345/441–443; 340/995.1–995.28; 701/208
See application file for complete search history.

(56) References Cited

U.S. PATENT DOCUMENTS

| 5,566,292 | A | 10/1996 | Krembs |
| 5,893,081 | A | 4/1999 | Poppen |
| 6,812,925 | B1 * | 11/2004 | Krishnan et al. ............ 345/423 |

| 2003/0109984 | A1 | 6/2003 | Adachi |
| 2005/0102097 | A1 * | 5/2005 | Tanizaki et al. ............. 701/208 |
| 2005/0209774 | A1 | 9/2005 | Finlay |
| 2005/0244058 | A1 | 11/2005 | Gorbatov |

OTHER PUBLICATIONS

Wu and Marquez, A non-self-intersection Douglas-Peucker algorithm, In Proceedings of the XVI Brazilian Symposium on Computer Graphics and Image Processing, pp. 60-66, Oct. 2003.*
International Search Report and Written Opinion of the International Searching Authority, International application No. PCT/US06/29711, Mar. 10, 2008.
Dijkstra, E.W., "A Note on Two Problems in Connexion with Graphs," Numerische Mathematik, 1959, pp. 269-271, vol. 1.

(Continued)

Primary Examiner—Xiao M Wu
Assistant Examiner—Tize Ma
(74) Attorney, Agent, or Firm—Fenwick & West LLP

(57) ABSTRACT

Generalization of features in a digital map is enabled by performing a simplification of polylines. A set of chords between points on a polyline is selected such that each chord does not violate specified rules such as maximum distance from the original polyline. If a chord is acceptable, a node representing the chord is created, described by the start and end points of the chord. For pairs of nodes created, a transition from the first node to the second node is evaluated to determine whether it is acceptable. In one embodiment, a transition is acceptable if the absolute value of the angle formed by the chords is within a threshold angle from the angle formed by the original polyline at that point. If the transition is acceptable, a link between the two nodes is established. A least-cost path through the graph is chosen, and a simplified polyline is then generated.

18 Claims, 7 Drawing Sheets

OTHER PUBLICATIONS

Douglas, David H., et al., "*Algorithms for the Reduction of the Number of Points Required to Represent a Digitized Line or its Caricature,*" The Canadian Cartographer, 1973, pp. 112-122, vol. 10, No. 2.

Lang, T., "*Rules for robot draughtsmen,*" Geographical Magazine, 1969, pp. 50-51, vol. 42.

PCT International Search Report and Written Opinion, PCT/US2008/072393, Nov. 3, 2008, 8 Pages.

Extended European Search Report, European Patent Application No. 06788966.7, May 3, 2010, 8 Pages.

McMaster, R., "Automated Line Generalization," Cartographica, Jan. 1, 1987, pp. 74-111, vol. 24, No. 2, University of Toronto Press.

\* cited by examiner

GENERALIZATION OF FEATURES IN A DIGITAL MAP

CROSS-REFERENCE TO RELATED APPLICATIONS

This application claims the benefit of U.S. Provisional Application 60/702,778, filed on Jul. 26, 2005, incorporated by reference herein in its entirety.

BACKGROUND OF THE INVENTION

1. Field of the Invention

The present invention is related to generalization in digital maps.

2. Description of the Related Art

Generalization in Maps

When a paper map is produced, shapes of objects represented in the map are rarely the same as they are in reality. For maps at all but the largest (most zoomed-in) scale, it is physically impossible to represent complex shapes like mountain roads exactly, because the width of the line describing the object is much too great to allow the true shape of the object to be illustrated. Cities, parks, and other areas may also have boundaries with complex shapes. Even when the line on a map is not too wide to allow a true representation of a shape, cartographers often smooth out a complex shape to make it more pleasing to a viewer's eye.

The simplification of objects represented on a map is called generalization. Generalization includes many kinds of operations: Complicated lines and boundaries may be smoothed out; narrow areas such as rivers may be represented as single lines; small areas such as small parks may be represented as single points; divided roads may be represented by single lines; highway interchanges may be represented by icons, often small white squares, instead of having their constituent roadways depicted; objects near roads may be displaced slightly from their true positions to improve visibility. All of these operations are forms of generalization. Our primary focus, however, is the first of these, namely, the simplification of lines. These lines can represent objects drawn one-dimensionally, such as roads, or the boundaries of two-dimensional objects, such as cities and parks.

Simplification as a Form of Generalization

In digital maps, one- and two-dimensional objects are typically represented as polylines or polygons. A polyline is a connected sequence of straight line segments. A polygon is a polyline that starts and ends at the same point. That is, if an object is actually curved in the real world, it is approximated by a sequence of points, called shape points, and the straight line segments connecting them. In the internal representation of the map, a one-dimensional object, or the one-dimensional boundary of a two-dimensional object, is typically represented by a list of its shape points. Because a polygon is merely a special case of a polyline, we frame the remaining discussion in terms of polylines for both increased readability and generality.

Often, in the use of digital map data the producer or user of the data finds that the data is much more precise, and the number of shape points is much greater, than is needed for the intended use. For example, this can happen when data originally collected for use at large (zoomed-in) scales is to be used instead at small (zoomed-out) scales. For example, digital road map data may be collected with enough shape points to guarantee that the polyline representing the road is never more than 20 meters from the actual road. When map data is to be used to draw a map of the entire United States on a computer screen, it typically suffices to make sure that the polyline is never more than five kilometers from the actual road. If the map is drawn using the more precise data, there are many times more points than necessary. This makes the data file much larger than necessary, and makes the processing time much longer than necessary as well.

Faced with this situation, the maker or user of digital map data often wants to generalize the polylines in a map so that they are not much more precise than the intended use requires. There are many possible ways to do this. In one method, each polyline is replaced by an entirely new polyline having new shape points, created in such a way that it does not deviate by more than a specified distance from the original polyline. In another method, each polyline is replaced by a new polyline with shape points selected from those of the original polyline in such a way that the new polyline does not deviate by more than a specified distance from the original polyline. That is, a subset of the shape points of the original polyline, in the order in which they occurred in the original polyline, is selected to be the shape points of the new polyline. This process is sometimes referred to as simplification of the original polyline. Because it is advantageous for algorithmic reasons not to introduce new shape points, simplification is often a desirable method of generalizing polylines. However, simplification can be carried out in a variety of ways, and conventional methods have some significant drawbacks associated with them.

One of the most common methods of polyline simplification is the Douglas-Poiker algorithm (D. H. Douglas and T. K. Peucker, Algorithms for The Reduction of The Number of Points Required to Represent a Digitized Line or its Caricature, 10 *Canadian Cartographer* 112-22, 1973). In this method, a maximum deviation distance $d_{max}$ is specified—for example, 5 km. The first and last shape points of the polyline are marked as "to be kept". The chord (direct line segment) from the first shape point $P_1$ to the last shape point $P_n$ of the original polyline is considered. The shape points of the original polyline are inspected to see whether any of them are more than the maximum distance $d_{max}$ from the chord. If any are, then the shape point $P_i$ farthest from the chord is marked as "to be kept", and the same operation is applied to the partial polylines from the beginning $P_1$ to the farthest point $P_i$ and from the farthest point $P_i$ to the end point $P_n$. This process of checking, marking, and subdividing is applied recursively until the original polyline has been broken up into pieces such that the chord from the beginning to the end of each piece is no farther than the maximum deviation distance $d_{max}$ from any of the shape points in between.

Another common algorithm is due to Lang (T. Lang, Rules For Robot Draughtsmen, 42 *Geographical Magazine* 50-51, 1969). In this method, a maximum number of points $n_{max}$ to step, and a maximum deviation distance $d_{max}$, are specified. The algorithm then starts at the first point $P_1$, which it marks as "to be kept". It then considers the chords from $P_1$ to $P_i$, where various values for i are tried, starting with $i=1+n_{max}$, then with $i=n_{max}$, then with $i=n_{max}-1$, then with $i=n_{max}-2$, and so on, until a chord is found that stays within distance $d_{max}$ of the original polyline. Suppose that the first such chord is from $P_1$ to $P_c$. The algorithm marks point $P_c$ as "to be kept", and then repeats the step of checking chords, from $P_c$ to $P_i$, starting with $i=c+n_{max}$, then with $i=c+n_{max}-1$, then with $i=c+n_{max}-2$, and so on, until a chord is found that stays within distance $d_{max}$ of the original polyline. The end point of the first such chord is marked as "to be kept". This process is then repeated until the last shape point of the polyline is marked as "to be kept".

There are other such common polyline simplification algorithms in use. The most commonly used algorithms, including those just discussed, share the property that the determination as to whether points are kept is based on properties of the intervening chords. However, since those chords are not considered in relation to other nearby chords, this can cause several problems when the resulting simplified polylines are used.

For example, without constraints on the angles formed by the resulting chords, the angles in the simplified polylines can be much sharper than in the original polyline. When the polylines are used for a purpose in which angles have significance, such as some driving-time estimating methods, the result can be significantly different from the original polyline, reducing the utility of the simplified polyline.

A more serious problem is that because the relationship of two chords that meet at a kept point is not constrained, the angle formed at the point can be reversed. For example, FIG. 1 illustrates a case in which an original polyline 102, which includes the shape points $P_1$, $P_2$, $P_3$, $P_4$, $P_5$, $P_6$, $P_7$, $P_8$, makes a sharp turn to the right at point $P_7$, but the generalized polyline 104, which comprises the shape points $P_1$, $P_7$, $P_8$, makes a sharp turn to the left at the same point $P_7$. If the polyline is used to describe a driving route, this can be unfortunate, causing a driver to go in the wrong direction. If it is used as the boundary of an area, such as a park or lake, the result is even worse—such a change in angle can make the boundary of the area no longer topologically correct, turning the area inside-out, and making it impossible to draw the area correctly using the new polyline.

Accordingly, there is a need for a way to simplify polylines of digital maps that is efficient and does not suffer from the drawbacks described above by not reversing angles or changing angles excessively.

SUMMARY OF THE INVENTION

The present invention enables generalization of features in a digital map by performing a simplification of polylines. A set of chords between points on the original polyline is selected such that each chord does not violate rules such as maximum distance from the original polyline, maximum distance between points, and the like. If a chord between two points on the polyline is considered acceptable, then a node representing the chord is created, described by the start and end points of the chord. Next, for pairs of nodes created, a transition from the first node in the pair to the second node in the pair is evaluated to determine whether it is acceptable. In one embodiment, a transition is acceptable if the absolute value of the angle formed by the chords is within a threshold angle from the angle formed by the original polyline at that point. If the transition is acceptable, a link between the two nodes is established. After each pair of nodes is considered, a set of paths through a directed graph can be evaluated for cost. The cost of a path includes the sum of costs assigned to each node and link in the path. A least-cost path through the graph is chosen, and a simplified polyline is then generated according to the selected path.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
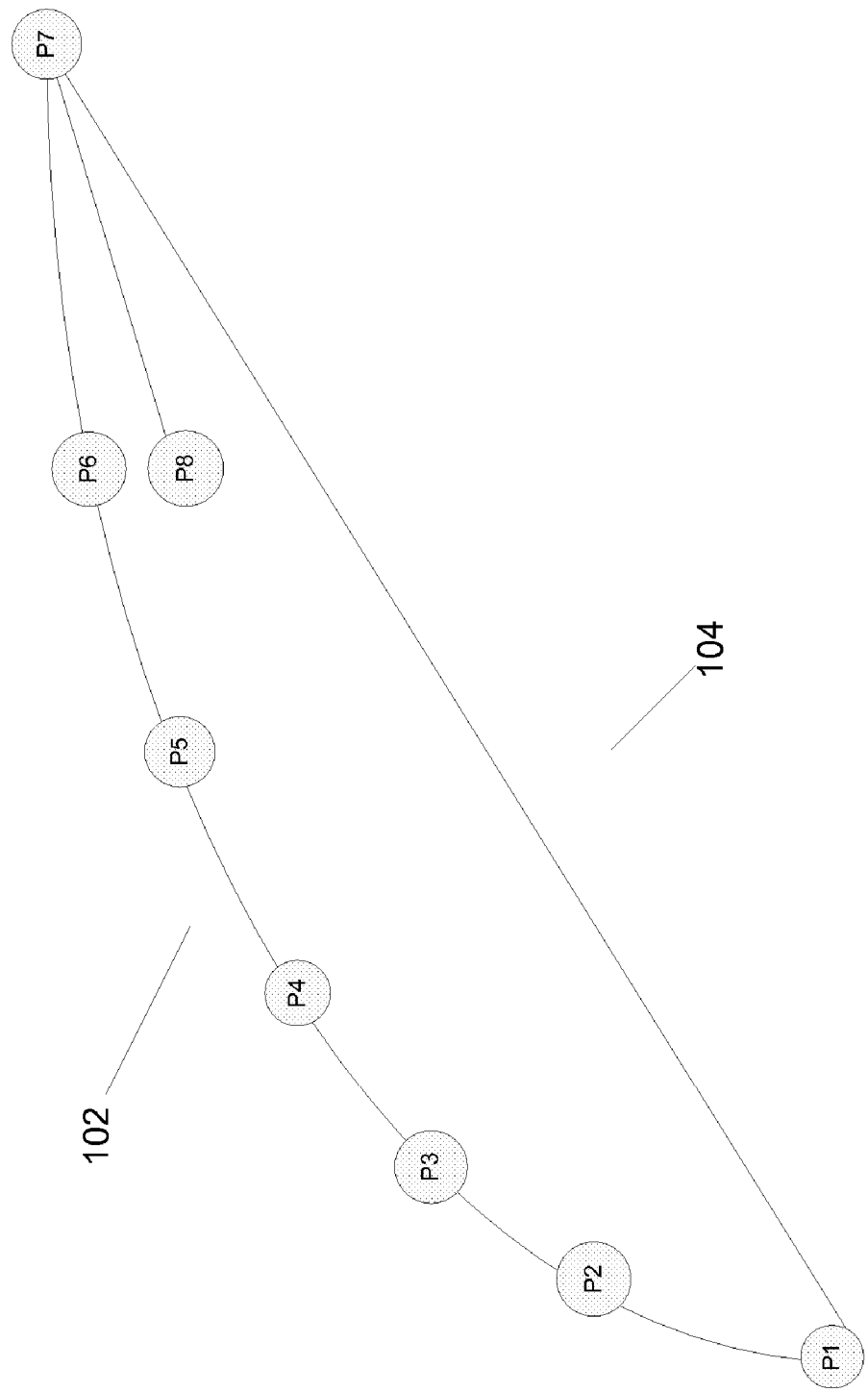
FIG. 1 is an illustration of a misleading simplified polyline generated according to a conventional method.
Figure 2:
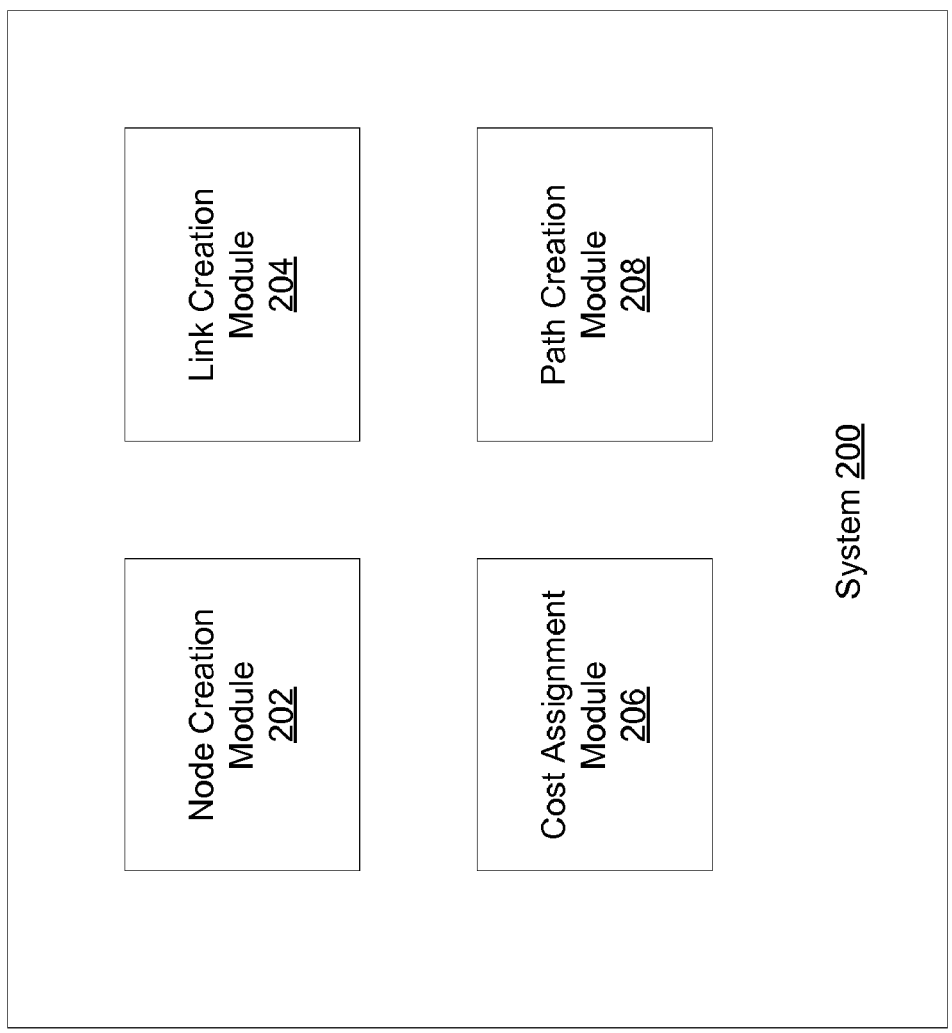
FIG. 2 is a block diagram illustrating a system for generalizing features in a digital map in accordance with an embodiment of the present invention.

FIG. 2 illustrates a block diagram of a system 200 for generalizing features in a digital map in accordance with an embodiment of the present invention. System 200 includes a node creation module 202, for creating a set of nodes; a link creation module 204 for creating a set of links; a cost assignment module 206 for assigning costs to the links and nodes created by link creation module 204 and node creation module 202, respectively; and a path creation module 208 for creating a least-cost path through a graph created as described now with respect to FIG. 3.

Figure 3:
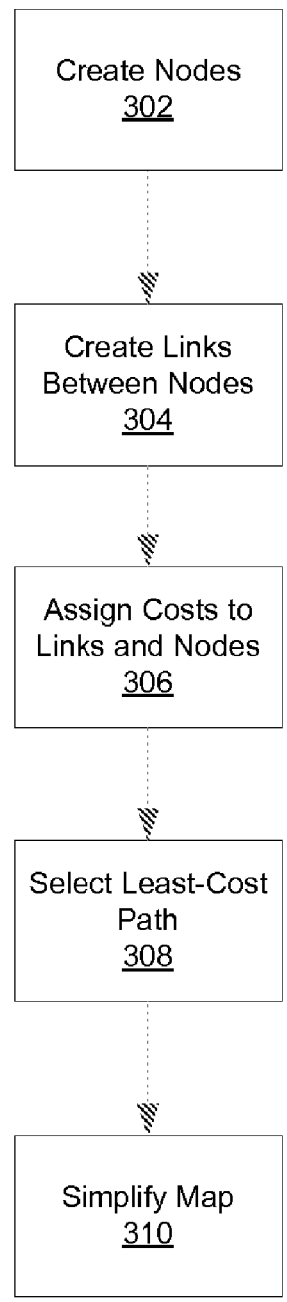
FIG. 3 is a flowchart illustrating a method for simplifying a digital map in accordance with an embodiment of the present invention.

As noted above, in order to create a map with generalized features in accordance with the present invention, a graph is created. FIG. 3 illustrates the construction of such a graph in a preferred embodiment. A graph is constructed by first creating 302 a set of nodes, as described further below with respect to FIG. 4. Next, links are created 304 between the nodes, as described further below with respect to FIG. 5. Finally, as described further below with reference to FIG. 6, costs are assigned 306 to the links and the nodes in the graph, a least-cost path through the graph is chosen 308, and a simplified map is created 310.

Figure 7:
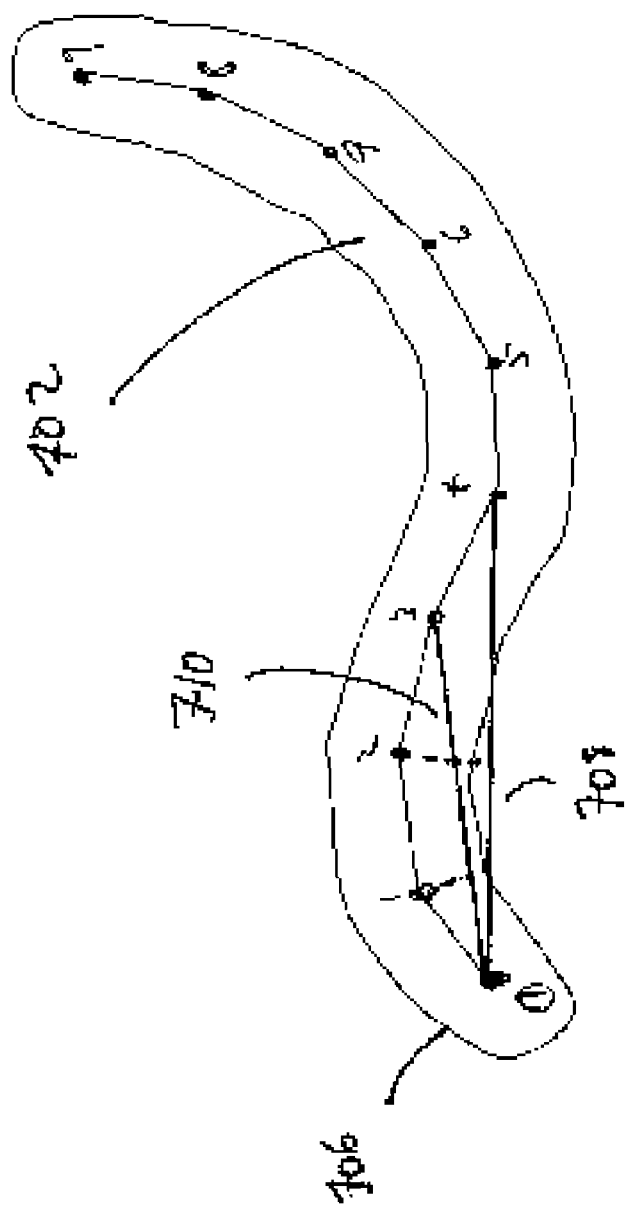
FIG. 7 is a diagram illustrating a polyline to be simplified in accordance with an embodiment of the present invention.

FIG. 7 provides an illustration of a polyline 702 that is to be simplified in accordance with the present invention. For purposes of example, assume that a tolerance 704 of length $d_{max}$ is provided as a requirement by the implementer. Then any chord in the simplification of polyline 702 must be with distance $d_{max}$ of the original polyline 702. This can be illustrated by drawing a "bubble" 706 around original polyline 702 enclosing those points within a distance of $d_{max}$ from the original polyline 702, and noting that any chord in the simplification of the original polyline 702 that travels outside of the bubble 706 has exceeded the tolerance distance from the original polyline.

A potential chord 708 from point 0 to point 4 is therefore unacceptable, since it is partially outside of the tolerance bubble 706 near points 1 and 2. In contrast, chord 710 is within the specified tolerance, and is therefore a potential candidate for the simplified polyline.

Suppose that the n points in the original polyline 702 are, in order, $P_0$, $P_1$, ..., $P_n$. System 200 constructs a directed graph based on the original polyline 702. In this context, a graph is a collection of nodes, some pairs of which are connected by links. As is known by those of skill in the art, the nodes in a graph are mathematical abstractions, and in illustrative drawings are typically represented by points. The nodes need not be points in two- or three-dimensional space. The links are connections between nodes. In a directed graph, the links have directions—for example, there may be a link from node A to node B, but no link from node B to node A. In illustrative drawings, the links are typically represented by straight or curved arrows. However, the links are mathematical abstractions and the paths or crossings of such arrows have no significance.

Figure 4:
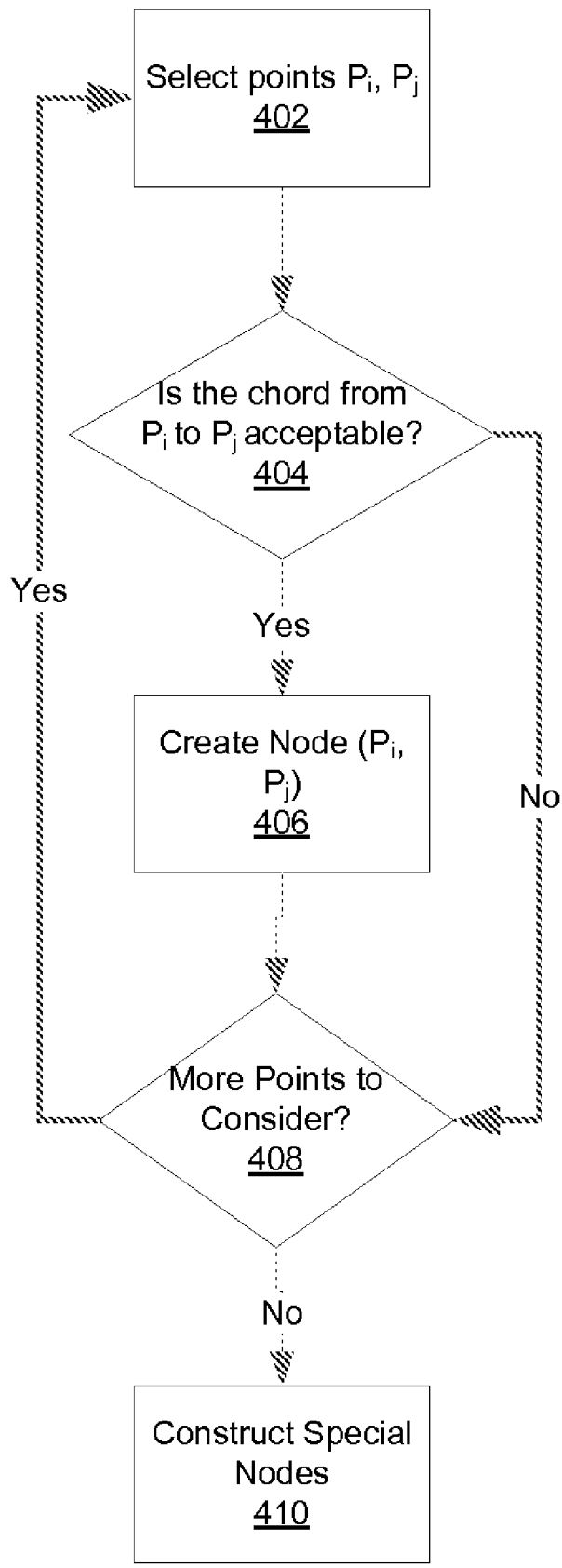
FIG. 4 is a flowchart illustrating the construction of nodes in accordance with an embodiment of the present invention.

FIG. 4 illustrates the selection of nodes by node creation module 202 for the directed graph in a preferred embodiment. The nodes of the directed graph represent potential chords in a simplification of the polyline 702. First, a pair of points $P_i$ and $P_j$ is selected 402, where i<j, and a determination is made as to whether 404 the chord from $P_i$ to $P_j$ is acceptable. In one embodiment, node creation module 202 makes this determination by comparing the chord from $P_i$ to $P_j$ to the original polyline between $P_i$ and $P_j$, and determining whether the chord remains within a previously specified distance $d_{max}$ 704 of the polyline. Other criteria may also be applied. For example, in one embodiment a chord is considered unacceptable if the heading at each end of the chord deviates from the heading of the original polyline at that point by more than a specified maximum angle, other criteria notwithstanding. Alternatively, a chord from $P_i$ to $P_j$ may be considered unacceptable if the number of points between $P_i$ and $P_j$ in the original polyline is more than a maximum number, or if the length of the chord from $P_i$ to $P_j$ is greater than a maximum length, or if the distance from $P_i$ to $P_j$ along the original polyline is greater than a maximum distance, or if the ratio of the length of the polyline between $P_i$ and $P_j$ to the length of the chord from $P_i$ to $P_j$ exceeds a maximum value. Those of skill in the art will appreciate that there are many possible criteria that can be used to determine acceptability or unacceptability of a given chord. Note also that a segment of the original polyline 702, that is, a chord from one point in the original polyline to the next point in the original polyline is preferably itself acceptable. If the chord from $P_i$ to $P_j$ is acceptable 404, node creation module 202 creates 406 a node $(P_i, P_j)$ to represent that chord. If 408 more points remain to be considered, the process is repeated. In addition, two special nodes (START, $P_1$) and ($P_n$, END) are preferably created 410 at the first and last points of the original polyline, respectively. Thus, at the conclusion of the node creation process, node creation module 202 has created a set of nodes, each representing a valid chord.

Figure 5:
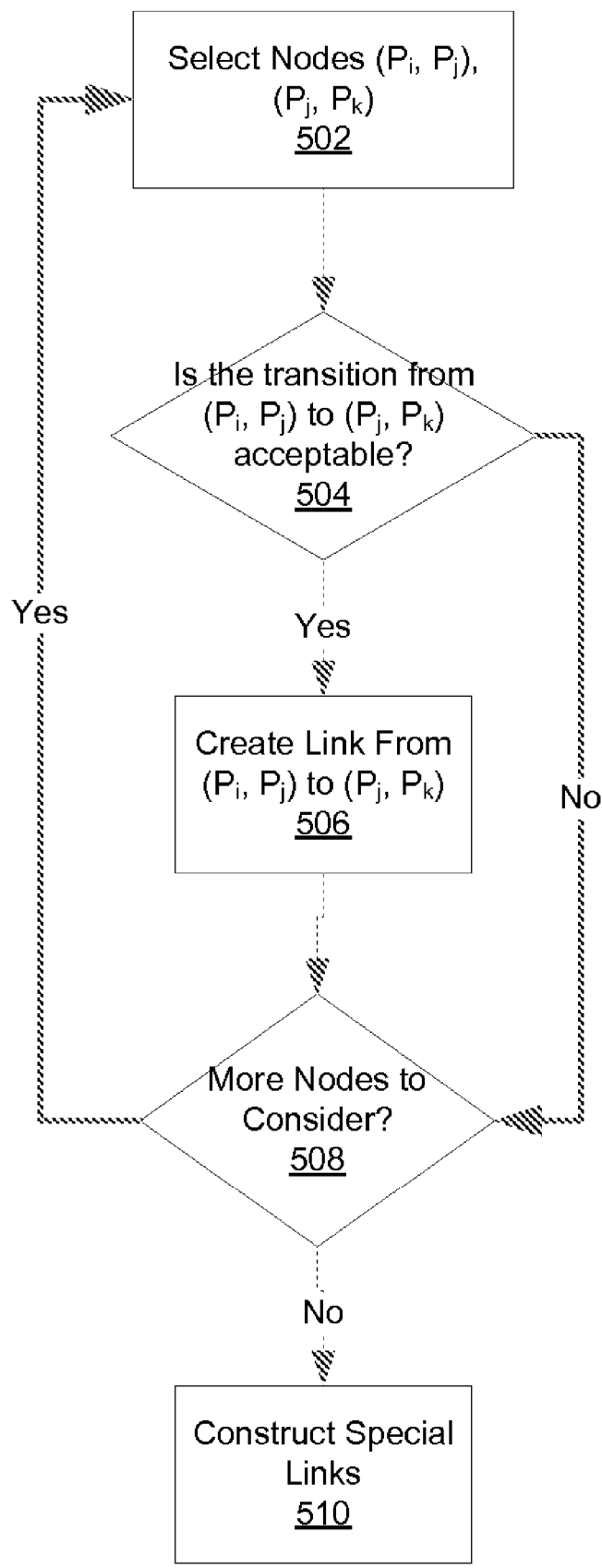
FIG. 5 is a flowchart illustrating the construction of links in accordance with an embodiment of the present invention.

Next, referring to FIG. 5, link creation module 204 creates links as follows in a preferred embodiment. A pair of nodes $(P_i, P_j)$ and $(P_j, P_k)$ created by node creation module 202 as described above are selected 502, in which the second shape point of the first node is the same as the first shape point of the second node. The pair are then examined by link creation module 204 to determine 504 whether the transition from the first chord (from $P_i$ to $P_j$) to the second chord (from $P_j$ to $P_k$) is allowed. If the transition from the first chord to the second chord is allowed, then a link from the first node to the second node is constructed 506. In one embodiment, a rule for determining whether a transition is allowed is as follows: the angle formed by the original polyline at $P_j$ is compared to the angle formed by the two chords at $P_j$. These angles are computed in a signed manner, so that, for example, a change in angle to the left at $P_j$ is considered to be a positive angle, while a change in angle to the right is considered to be a negative angle. Then the transition from the first chord to the second chord is considered allowable if the absolute value of the difference between the signed angle in the original polyline and the signed angle between the chords does not exceed a predetermined threshold. A suitable limit on the absolute value of the difference, such as 180 degrees or any smaller limit will prevent the "turning inside out" of a boundary, a problem of some conventional methods as described above. Whatever the rule for determining allowable transitions, the transition between the chords representing two consecutive segments of the original polyline $(P_i, P_{i+1})$ and $(P_{i+1}, P_{i+2})$ is preferably allowed, and a link constructed between their nodes. If 508 additional nodes remain to be considered, the steps are repeated for the remainder. In addition to the links described above, in a preferred embodiment a link is constructed 510 from a special node (START, $P_1$) to every node $(P_1, P_i)$ representing a chord starting at the first shape point of the original polyline. Also, from every node $(P_j, P_n)$ representing a chord ending at the last shape point of the original polyline a link is preferably constructed to a special node ($P_n$, END).

Figure 6:
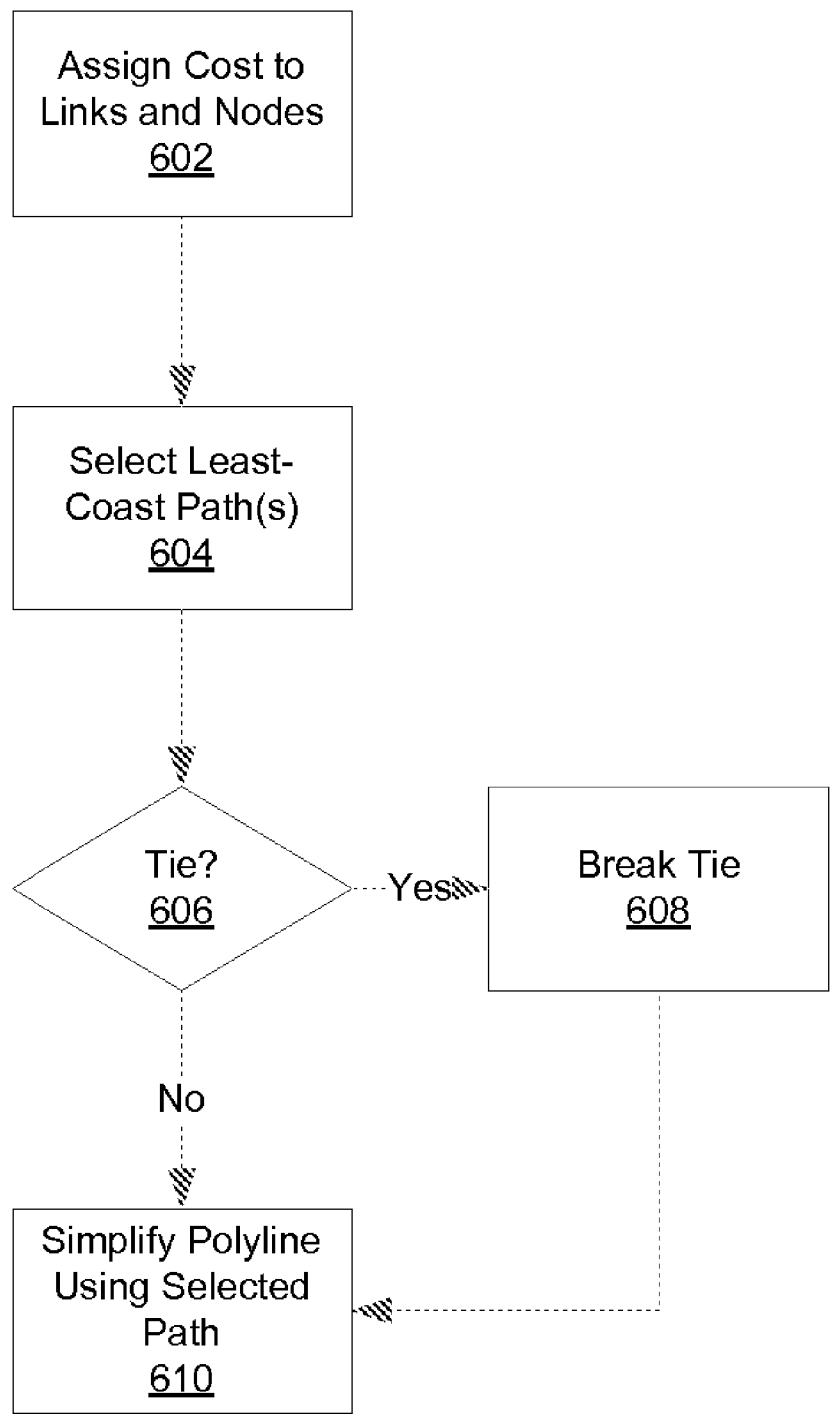
FIG. 6 is a flowchart illustrating the selection of a least-cost path in accordance with an embodiment of the present invention.

Next, and referring to FIG. 6, cost assignment module 206 assigns 602 a cost to each link and each node. As will be understood by those of skill in the art, this cost is an abstract score, the total of which is typically sought to be minimized. In one embodiment, the cost of each node is one unit and the cost of each link is zero units, but other values may be used. The cost of a path is then a function of the costs of the nodes and links contained in the path; the function is preferably a sum, although other functions could be chosen. From all possible paths through the directed graph, starting at the special node (START, $P_1$), proceeding along links in the graph, and ending at the special node ($P_n$, END), cost assignment module 206 selects 604 a path with a minimal total cost. Given a directed graph with costs assigned to its nodes, there are many well-known methods for finding such a least-cost path. One such algorithm in the art is commonly known as Dijkstra's algorithm (E. W. Dijkstra, "A note on two problems in connexion with graphs," 1 *Numerische Mathematik* 269-271, 1959). In some instances, there may be more than one path with the same minimal total cost; in such a case 606, any such path may be selected, though preferably a tie-breaking decision is made 608. The path will comprise a sequence of nodes with connecting links, where the second shape point of each node is the same as the first shape point of the next node: (START, $P_1$), ($P_1, P_i$), ($P_i, P_j$), . . . , ($P_l, P_m$), ($P_m, P_n$), ($P_n$, END). The sequence of chords represented by the nodes (other that the starting and ending special nodes) is then selected 610 as the simplified polyline.

As noted above, in some instances there may be more than one path through the directed graph with the same minimum cost. In order to choose a preferred path among all such paths, in one embodiment a second cost is defined for each node and each link in addition to the first cost described above. Then, among all the paths with a minimal total first cost, a path with a minimal total second cost is chosen. In one embodiment, the cost of each node $(P_i, P_j)$ is the square of the number of original line segments spanned by the chord $(j-i)^2$, and the cost of each link is zero. It can be seen that using this second cost will choose, among the simplifications with the same number of shape points, a simplification with chords that skip over numbers of shape points as nearly equal to each other as possible. In other embodiments, a third cost can be used to break ties in the first and second costs, a fourth cost can be used to break ties in the first, second, and third costs, and so on. A method of computing a route using first, second, and further costs is described in U.S. Pat. No. 5,893,081, which is incorporated by reference herein in its entirety.

Polylines representing one object on a map are preferably generalized such that they do not interfere with other objects on the map. For example, when the polylines representing two roadways of a divided road are generalized, it is desirable to prevent the two generalizations from crossing. Similarly, when a polyline representing a road near a lake is generalized, it is undesirable to generalize the polyline so that the road appears to go through the lake. As a third example, when a polyline representing a road that passes near a point of interest, such as a store, is generalized, it is undesirable to generalize the line so that the point of interest changes from one side of the road to the other. To prevent such problems, in one embodiment each chord is examined for acceptability not only as described above but in addition by comparing it to a collection of nearby "forbidden" map objects. A forbidden map object is one forbidden to intersect the generalized polyline, or to be on one side of the original polyline and on the other side of the generalized polyline. If the chord intersects any forbidden object, or if any forbidden object is on one side of a chord but on the other side of that part of the polyline between the endpoints of the chord, then the chord is considered unacceptable, and no node is created to represent it, notwithstanding its acceptability according to other criteria. For example, in one embodiment a check to see whether an object has switched sides can be carried out by determining whether the object is inside a polygon formed by the chord and the part of the original polyline spanned by the chord. If so, then the object has switched sides.

An embodiment of the invention has been described in which nodes correspond to single chords, and links represent acceptable chord-to-chord transitions. This allows a user of the system to specify what chords are acceptable (via the set of nodes) and what chord-to-chord transitions are acceptable (via the set of links), but not what chord-to-chord-to-chord transitions are acceptable. In other embodiments, nodes can represent sequences of two chords, or of three chords, and so on, and links can represent correspondingly longer acceptable transition sequences. For example, if each node represents an acceptable sequence of two chords ($P_i$, $P_j$, $P_k$), then a link is defined between two nodes ($P_i$, $P_j$, $P_k$) and ($P_j$, $P_k$, $P_l$) only when the last two points in the first node are the same as the first two points in the second node, and the chord-to-chord-to-chord transition from the chord ($P_i$, $P_j$) to the chord ($P_j$, $P_k$) to the chord ($P_k$, $P_l$) is acceptable according to a predetermined rule. By representing n shape points, and therefore (n−1) chords, in each node, the method can accept or reject sequences of up to n chords.

Those of skill in the art will appreciate that in its implementation, data structures representing the entire graph need not exist simultaneously. It is possible to embody the invention in such a way that, as links are considered in turn, certain links are rejected, and no representation of them is retained, before other links are considered and representations of them are created.

The present invention has been described in particular detail with respect to a limited number of embodiments. Those of skill in the art will appreciate that the invention may additionally be practiced in other embodiments. For example, the functionality of the graph-generating engine can be provided in other embodiments by other modules. The present invention also has application beyond the simplification of digital maps. For example, in various embodiments the present invention can be used to simplify polylines in any application in two- or higher-dimensional space, for example in rendering drawings with vectors.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of node creation module 202, link creation module 204 and so forth may be provided in many or one module.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "selecting" or "computing" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

I claim:

1. A method for generalizing a feature of a digital map, the feature including a polyline, the polyline including a plurality of shape points, the method comprising:
    creating, by a computer, a set of nodes by, for each pair of shape points in the polyline:
        determining, by the computer, whether a chord from the first shape point of the pair to the second shape point of the pair is acceptable;
        responsive to the chord being acceptable, creating, by the computer, a node representing the chord;
    creating, by the computer, a set of links by, for each pair of nodes in which the second shape point in one node is the same shape point as the first shape point in the other node:
        determining, by the computer, a first angle, the first angle formed by the polyline at the shape point;
        determining, by the computer, a second angle, the second angle formed by a transition from the chord represented by the first of the pair of nodes to the chord represented by the second of the pair of nodes;
        comparing the first angle and the second angle to determine whether the transition having the second angle is acceptable;
        responsive to the transition being acceptable, creating, by the computer, a link between the pair of nodes;
    for each path from a node including the first shape point in the polyline to a node including the last shape point in the polyline, determining a cost of the path based on a cost associated with each node and a cost associated with each link; and
    generating, by the computer, as a simplified polyline the polyline represented by the path having the least cost.

2. The method of claim 1, wherein the set of created nodes includes a first node, the first node having a first start point not on the polyline and a second point on the polyline, and a second node, the second node including the last point on the polyline and an end point not on the polyline.

3. The method of claim 1 wherein a chord from a first point of a pair of nodes in the polyline to a second point of the pair of nodes in the polyline is acceptable if a maximum distance between the polyline and the chord is less than a threshold amount.

4. The method of claim 1 wherein a chord from a first point of a pair of nodes in the polyline to a second point of the pair of nodes in the polyline is acceptable if a heading at each end of the chord deviates from a heading of the original polyline at that point by less than a threshold angle.

5. The method of claim 1 wherein a chord from a first point of a pair of nodes in the polyline to a second point of the pair of nodes in the polyline is acceptable if a number of points on the polyline between the first point of the pair of nodes and the second point of the pair of nodes is more than a threshold number.

6. The method of claim 1 wherein a chord from a first point of a pair of nodes in the polyline to a second point of the pair of nodes in the polyline is acceptable if the length of the chord is less than a threshold length.

7. The method of claim 1 wherein determining whether the transition having the second angle is acceptable further comprises:
    responsive to the absolute value of the difference between the first angle and the second angle not exceeding a threshold amount, determining that the transition is acceptable.

8. The method of claim 7 wherein the threshold amount is 180 degrees.

9. The method of claim 1 wherein:
    determining whether a chord is acceptable further comprises determining whether the chord intersects a forbidden map object; and
    responsive to the chord intersecting the forbidden map object, determining that the chord is not acceptable.

10. A computer program product for generalizing a feature of a digital map, the feature including a polyline, the polyline including a plurality of shape points, the computer program product stored on a non-transitory computer readable medium and including instructions configured to cause a processor to carry out the steps of:
    creating a set of nodes by, for each pair of shape points in the polyline:
        determining whether a chord from the first shape point of the pair to the second shape point of the pair is acceptable;
        responsive to the chord being acceptable, creating a node representing the chord;
    creating a set of links by, for each pair of nodes in which the second shape point in one node is the same point as the first shape point in the other node:
        determining a first angle, the first angle formed by the polyline in the shape point;
        determining a second angle, the second angle formed by a transition from the chord represented by the first of the pair of nodes to the chord represented by the second of the pair of nodes;
        comparing the first angle and the second angle to determine whether the transition having the second angle is acceptable;
        responsive to the transition being acceptable, creating a link between the pair of nodes;
    for each path from a node including the first shape point in the polyline to a node including the last shape point in the polyline, determining a cost of the path based on a cost associated with each node and a cost associated with each link; and
    selecting as a simplified polyline the polyline represented by the path having the least cost.

11. The computer program product of claim 10, wherein the set of created nodes includes a first node, the first node having a first start point not on the polyline and a second point on the polyline, and a second node, the second node including the last point on the polyline and an end point not on the polyline.

12. The computer program product of claim 10, wherein a chord from a first point of a pair of nodes in the polyline to a second point of the pair of nodes in the polyline is acceptable if a maximum distance between the polyline and the chord is less than a threshold amount.

13. The computer program product of claim 10 wherein a chord from a first point of a pair of nodes in the polyline to a second point of the pair of nodes in the polyline is acceptable if a heading at each end of the chord deviates from a heading of the original polyline at that point by less than a threshold angle.

14. The computer program product of claim 10 wherein a chord from a first point of a pair of nodes in the polyline to a second point of the pair of nodes in the polyline is acceptable if a number of points on the polyline between the first point of the pair of nodes and the second point of the pair of nodes is more than a threshold number.

15. The computer program product of claim 10 wherein a chord from a first point of a pair of nodes in the polyline to a second point of the pair of nodes in the polyline is acceptable if the length of the chord is less than a threshold length.

16. The computer program product of claim 10 wherein determining whether the transition having the second angle is acceptable further comprises:

responsive to the absolute value of the difference between the first angle and the second angle not exceeding a threshold amount, determining that the transition is acceptable.

17. The computer program product of claim 16 wherein the threshold amount is 180 degrees.

18. The computer program product of claim 10 wherein:

determining whether a chord is acceptable further comprises determining whether the chord intersects a forbidden map object; and responsive to the chord intersecting the forbidden map object, determining that the chord is not acceptable.

* * * * *